(12) United States Patent
Fabian

(10) Patent No.: US 7,905,439 B2
(45) Date of Patent: *Mar. 15, 2011

(54) APPARATUS AND METHOD FOR TAPERED CORE DRUM PACKAGE PAYOFF

(75) Inventor: Gabor Fabian, Brampton (CA)

(73) Assignee: Lincoln Global, Inc., City of Industry, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 11/847,410

(22) Filed: Aug. 30, 2007

(65) Prior Publication Data

US 2009/0057459 A1    Mar. 5, 2009

(51) Int. Cl.
    *B65H 51/015* (2006.01)
(52) U.S. Cl. ............ 242/171; 242/566; 242/588.6; 242/613.1; 242/129
(58) Field of Classification Search .......... 242/170, 242/171, 172, 566, 588.3, 588.6, 608.7, 128, 242/129, 613, 613.1, 610.2
    See application file for complete search history.

(56) References Cited

U.S. PATENT DOCUMENTS

| | | | |
|---|---|---|---|
| 2,833,912 A | 5/1958 | Royer | |
| 2,943,732 A * | 7/1960 | Kovaleski et al. | 206/389 |
| 3,119,042 A | 1/1964 | Marshall | |
| 4,135,679 A | 1/1979 | Murphy et al. | |
| 4,179,056 A | 12/1979 | Schmerling | |
| 4,202,509 A * | 5/1980 | Horn | 242/593 |
| 4,253,624 A | 3/1981 | Colbert | |
| 4,404,457 A | 9/1983 | Rokujio et al. | |
| 4,512,533 A | 4/1985 | Morival et al. | |
| 4,531,682 A | 7/1985 | Schroder et al. | |
| 4,657,204 A | 4/1987 | Colbert | |
| 4,754,937 A | 7/1988 | Hoddinott et al. | |
| 4,869,367 A | 9/1989 | Kawasaki et al. | |
| 5,657,935 A | 8/1997 | Cooper | |
| 5,758,834 A | 6/1998 | Dragoo et al. | |
| 6,903,305 B2 | 6/2005 | Mukai et al. | |
| 7,004,419 B2 * | 2/2006 | Hsu | 242/361.4 |
| 7,178,755 B2 | 2/2007 | Hsu et al. | |
| 2003/0230660 A1 * | 12/2003 | Vernam | 242/271 |
| 2004/0155090 A1 | 8/2004 | B.-Jensen | |
| 2004/0211851 A1 | 10/2004 | Barton et al. | |
| 2005/0127233 A1 * | 6/2005 | Hsu et al. | 242/566 |
| 2005/0224381 A1 * | 10/2005 | Bae et al. | 206/409 |
| 2006/0102505 A1 * | 5/2006 | Hsu et al. | 206/408 |
| 2009/0057460 A1 * | 3/2009 | Fabian | 242/171 |

FOREIGN PATENT DOCUMENTS

| | | |
|---|---|---|
| EP | 1 057 751 A | 12/2000 |
| EP | 1 621 503 A | 2/2006 |
| GB | 1 583 750 | 2/1981 |
| JP | 2001 138052 A | 5/2001 |

OTHER PUBLICATIONS

PCT/IB2008/002139 International Search Report.
PCT/IB2008/002145 International Search Report dated Feb. 5, 2009.

* cited by examiner

*Primary Examiner* — Michael R Mansen
*Assistant Examiner* — William E Dondero
(74) *Attorney, Agent, or Firm* — Hahn Loeser & Parks LLP

(57) ABSTRACT

Arrangements and methods for welding wire payoff sources. A tapered core and base plate, optionally along with a wire guide insert, are configured with a payout drum package and a cover containing a welding wire stack such that the welding wire may be payed off smoothly from the wire stack during an arc welding operation, without the welding wire flipping or tangling.

20 Claims, 14 Drawing Sheets

APPARATUS AND METHOD FOR TAPERED CORE DRUM PACKAGE PAYOFF

TECHNICAL FIELD

Certain embodiments relate to paying off a coil of wire. More particularly, certain embodiments relate to arrangements and methods for paying off wire from a welding wire stack.

BACKGROUND

Welding wire for electric arc welding is typically provided in a box or drum referred to as a payout drum package. The wire sits in the drum package, for example, coiled on a reel or spool and is referred to as the wire stack. A cover is attached to the drum package having a conduit attached to the cover. The wire is pulled through the conduit by a wire feeder of the welding machine and is used as an electrode in electric arc welding, for example. The term "pay off" is used in the wire industry and means pulling the wire out of the drum/box package or off the reel/spool.

When a welding wire is withdrawn or payed off from a welding wire stack residing in a payout drum package during an electric arc welding operation, for example, the spirals of the welding wire may tend to flip causing cork screws which result in tangling of the wire. Also, the stack may move within the drum with respect to the opening in the cover where the conduit is attached. Such movement of the wire stack with respect to the conduit may change the tension on the wire causing poor wire feedability and preventing smooth pay off. Such unwanted occurrences can reduce, if not totally destroy, welding effectiveness.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY

A first embodiment of the present invention comprises a welding wire payoff arrangement. The welding wire payoff arrangement includes a base plate and a tapered core centrally connected to the base plate. The base plate may include a plurality of tab receptors and the tapered core may include a plurality of tabs adapted to be received into the plurality of tab receptors of the base plate to centrally connect the tapered core to the base plate. The base plate may be substantially octagonal in shape and the tapered core may include two slots on opposing surfaces of the tapered core for receiving a rod through the tapered core. The welding wire payoff arrangement may include a payout drum package in which the connected base plate and tapered core reside. A wire stack may reside in the payout drum package such that the wire stack rests on the base plate and the tapered core protrudes through a centrally open region of the wire stack. A first diameter or width of the unconnected end of the tapered core is less than a second diameter or a second width of a connected base end of the tapered core.

Another embodiment of the present invention comprises a method of assembling a welding wire source. The method includes centrally connecting a tapered core to a base plate to form a first assembly. The method further includes placing the first assembly into a payout drum package such that the tapered core is substantially centered within the payout drum package. The method also includes placing a coiled wire stack into the payout drum package over the tapered core such that the wire stack rests on the base plate and the tapered core protrudes through a centrally open region of the wire stack. The method may further include inserting a holding member through the tapered core such that the holding member sits on top of the wire stack, and attaching at least one tension member between the holding member and the base plate or a bottom surface of the payout drum package such that the tension member pulls the holding member against the wire stack. The holding member may comprise a steel rod and the tension member may comprise a rubber band. The method may further include releasing a wire of the wire stack such that the wire spirals upward around the tapered core and feeding an end of the released wire through an opening in a cover. The method may further include attaching the cover to the payout drum package, feeding the end of the released wire through a conduit, and attaching the conduit to the cover.

A further embodiment of the present invention comprises a welding wire payoff arrangement. The welding wire payoff arrangement includes a tapered core means for spirally guiding a wire payed off from a wire stack. The welding wire payoff arrangement further includes a base means for centrally supporting the tapered core means within a payout drum package. The base means may include at least one first connector means for connecting the tapered core means to the base means. The tapered core means may include at least one second connector means for connecting the tapered core means to the base means via the first connector means. The base means may be substantially octagonal in shape. The rod means may be provided for securing the wire stack within the payout drum package. Two opening means may be present on opposing surfaces of the tapered core means for receiving the rod means through the tapered core means. A first diameter or a first width of a first end of the tapered core means may be less than a second diameter or a second width of a second end of the tapered core means.

These and other advantages and novel features of the present invention, as well as details of illustrated embodiments thereof, will be more fully understood from the following description and drawings.

DETAILED DESCRIPTION

Figure 1:
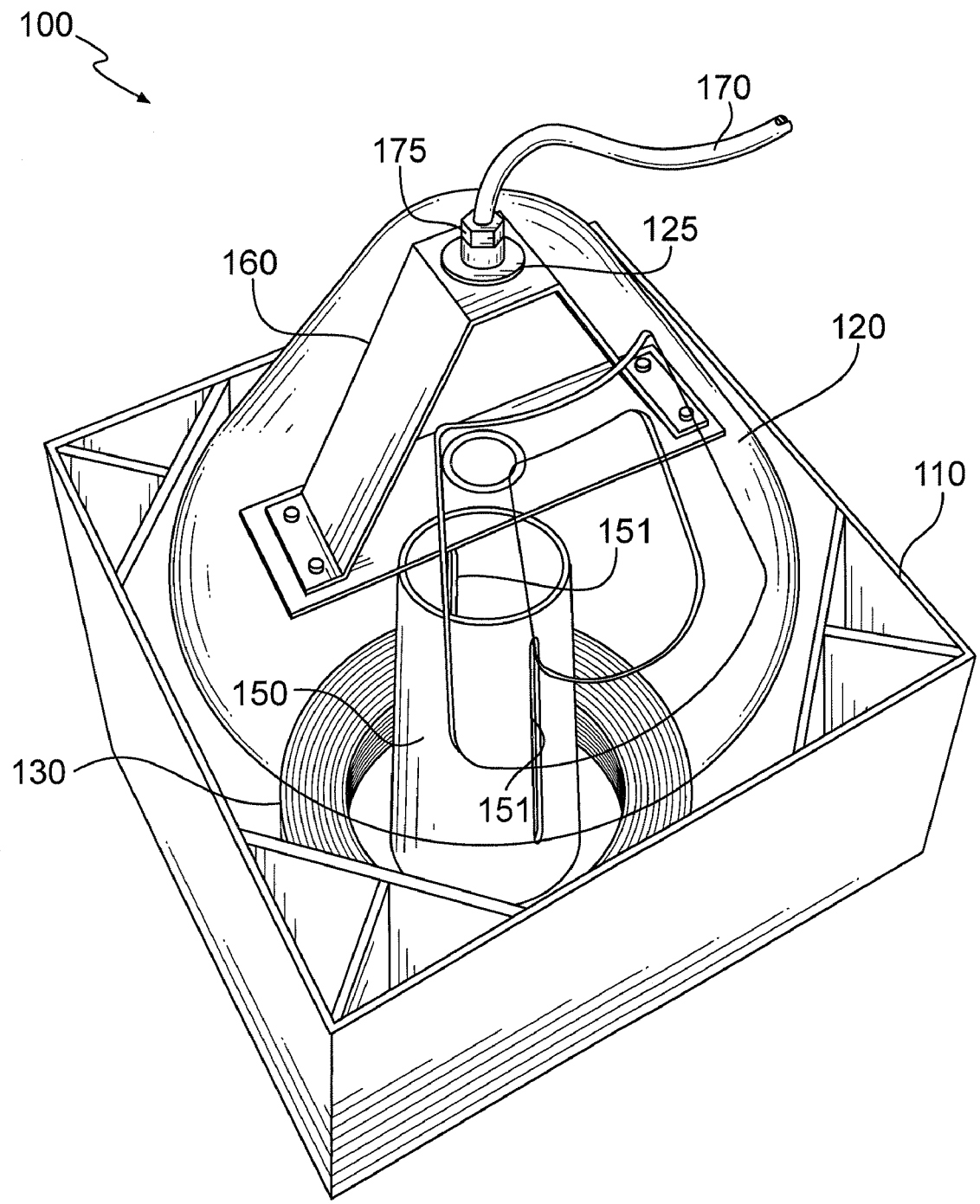
FIG. 1 is an illustration of an embodiment of a welding wire assembly or welding wire source.
Figure 2:
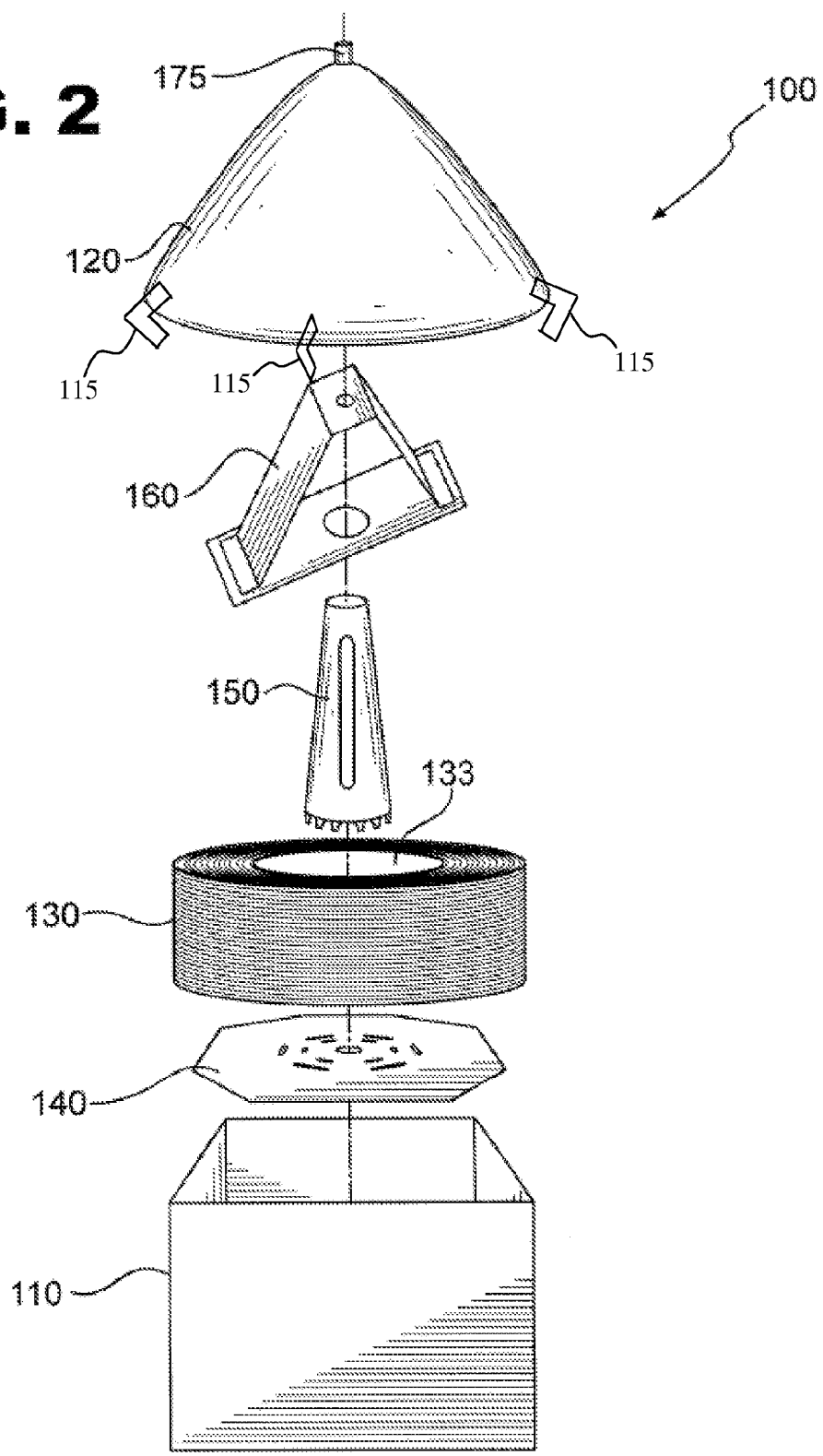
FIG. 2 is an exploded view of the welding wire assembly of FIG. 1.

FIG. 1 is an illustration of an embodiment of a welding wire assembly 100 (also referred to herein as a welding wire source). FIG. 2 is an exploded view of the welding wire assembly 100 of FIG. 1. The welding wire assembly 100 includes a payout drum package 110, a cover 120, a welding wire stack 130, a base plate 140, a tapered core 150, and optionally a wire guide insert 160. In certain embodiments, the wire guide insert 160 may or may not be used.

The tapered core 150 is connected to the base plate 140 at a center of the base plate 140. The base plate 140 may be placed to rest within the payout drum package 110 on the bottom interior surface of the payout drum package 110 such that the tapered core 150 is substantially centered within the payout drum package 110. The base plate 140 is relatively flat and the edges of the base plate 140 fit snug against the side walls of the payout drum package 110 to prevent lateral movement of the base plate 140 and connected tapered core 150 within the drum package 110.

In accordance with an embodiment of the present invention, the base plate 140 is octagonal in shape. Furthermore, the inner surface of the drum package 110 may be octagonal in shape as well, as shown in FIG. 1, to match the octagonal base plate 140. Such an octagonal shape of the interior surface of the drum package 110 helps to better hold a circular wire stack 130 in place when the outer diameter of the wire stack 130 substantially matches the inner diameter or width of the octagonal interior surface of the drum package 110.

The wire stack 130 may be placed over the tapered core 150 such that the wire stack 130 rests on the base plate 140 within the drum package 110 and such that the tapered core 150 protrudes upward through a centrally open region 133 of the wire stack 130. The wire stack 130 has an inner diameter and an outer diameter where the outer diameter of the wire stack 130 is substantially the same as the inner diameter or inner width of the drum package 110 such that the wire stack 130 does not tend to move laterally within the drum package 110.

The cover 120 attaches to the top of the drum package 110. In accordance with an embodiment, the cover is made of a transparent plastic material. The cover 120 has an opening 125 in the top where a conduit 170 may be connected via a connector 175. The wire from the wire stack 130 spirals upward around the tapered core 150 and is fed through the opening 125 when the wire is payed off. The conduit 170 guides the wire toward a wire feeder of a welding machine, in accordance with an embodiment of the present invention.

As the wire is payed off from the wire stack 130, the tapered core 150 remains in the center of the drum package 110. The tapered core 150 has a first diameter or width at its top end which is smaller or less than a second diameter or width at its base end (i.e., the tapered core is tapered). The tapered core 150 provides a smooth pay off of the wire from the drum package 110. The tapered core 150 applies enough tension on the wire to prevent the wire from flipping, which may cause cork screws and tangles in the wire. Keeping the tapered core 150 centered in the drum package 110 and, therefore, with respect to the opening 125 in the cover 120 also helps to provide for a smooth pay off.

Figure 3:
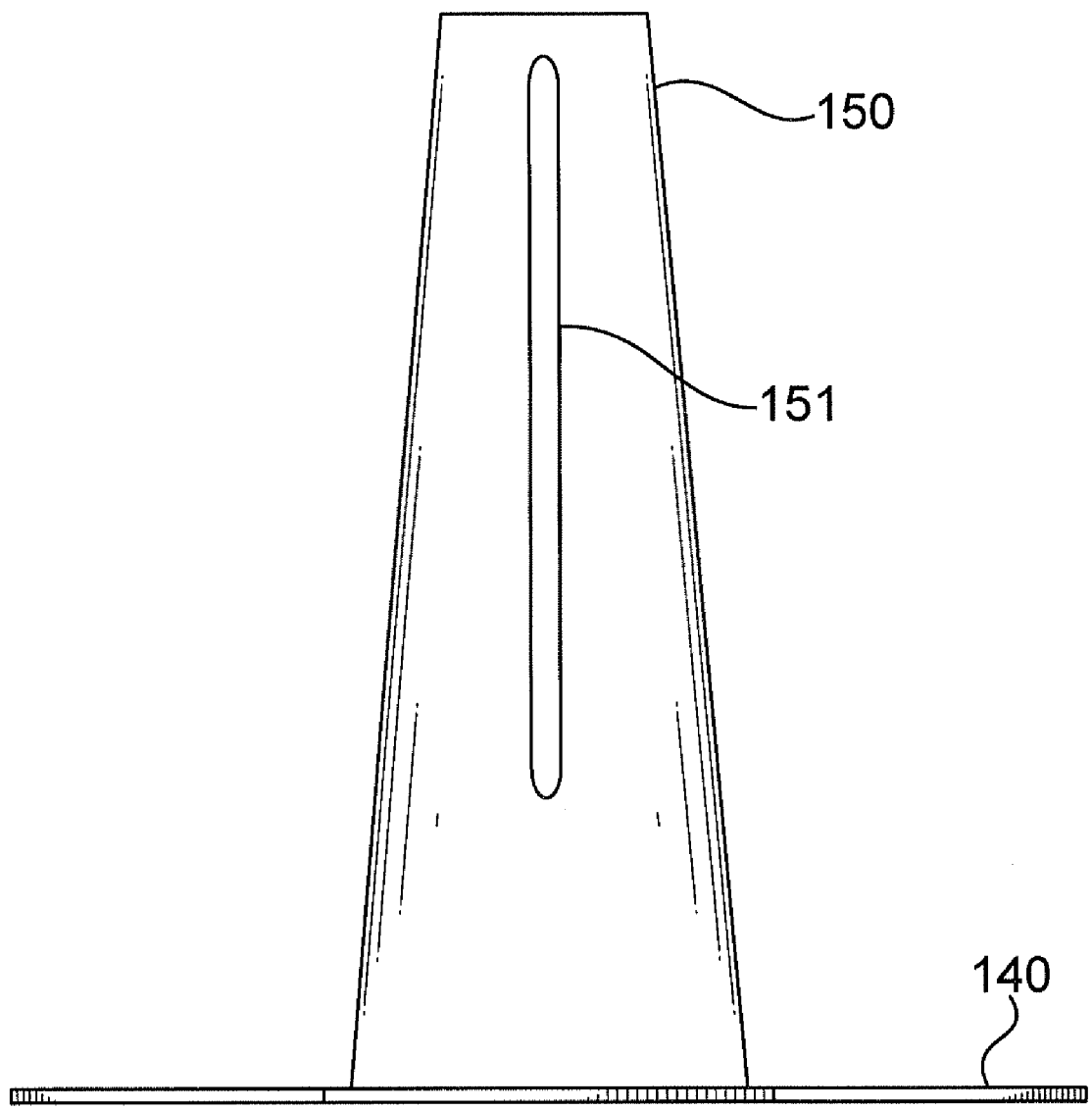
FIG. 3 is an illustration of a side view of an embodiment of a tapered core centrally connected to a base plate as used in the welding wire assembly of FIG. 1 and FIG. 2.
Figure 4:
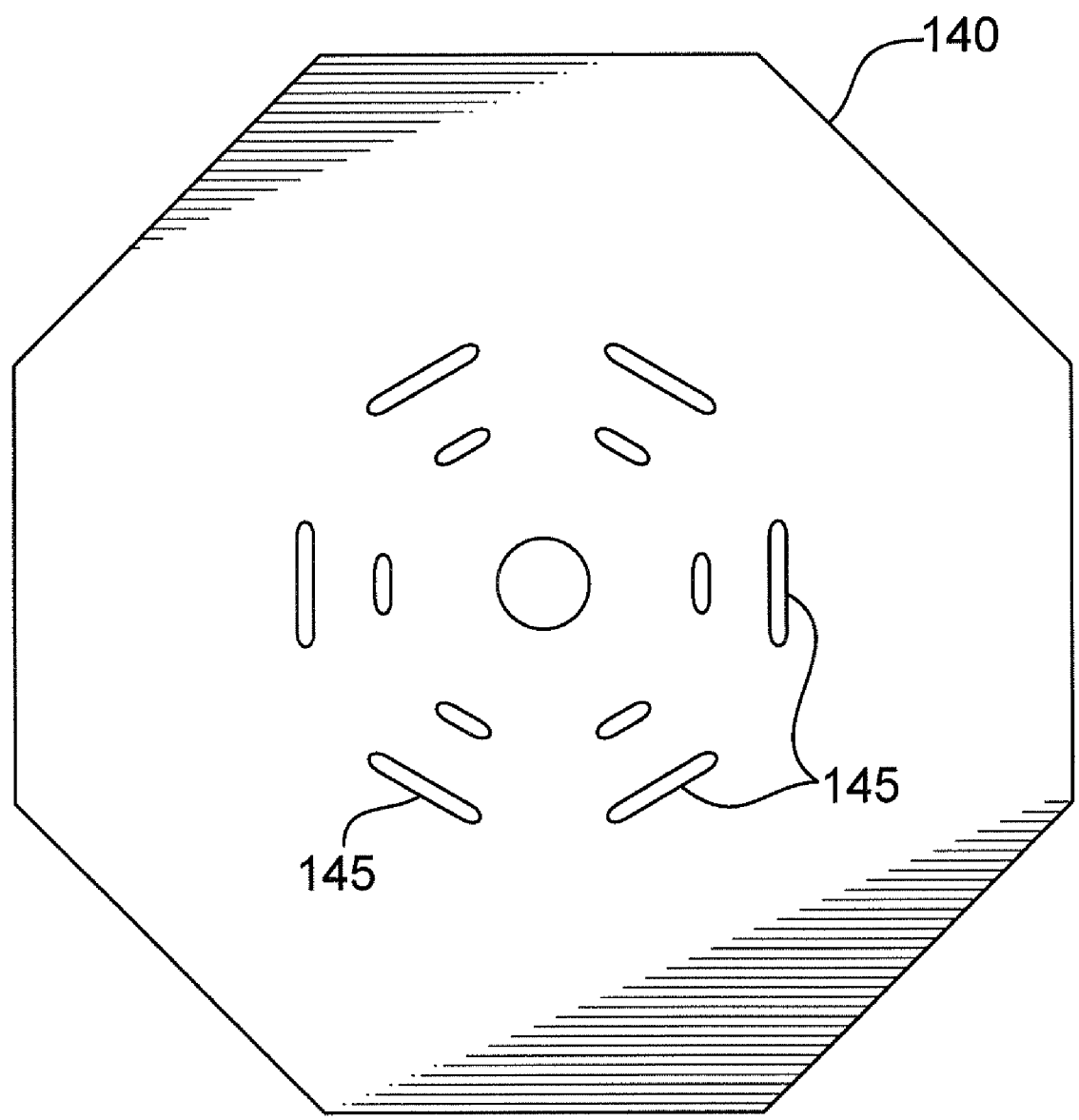
FIG. 4 is an illustration of a top view of an embodiment of the base plate shown in FIG. 3.
Figure 5:
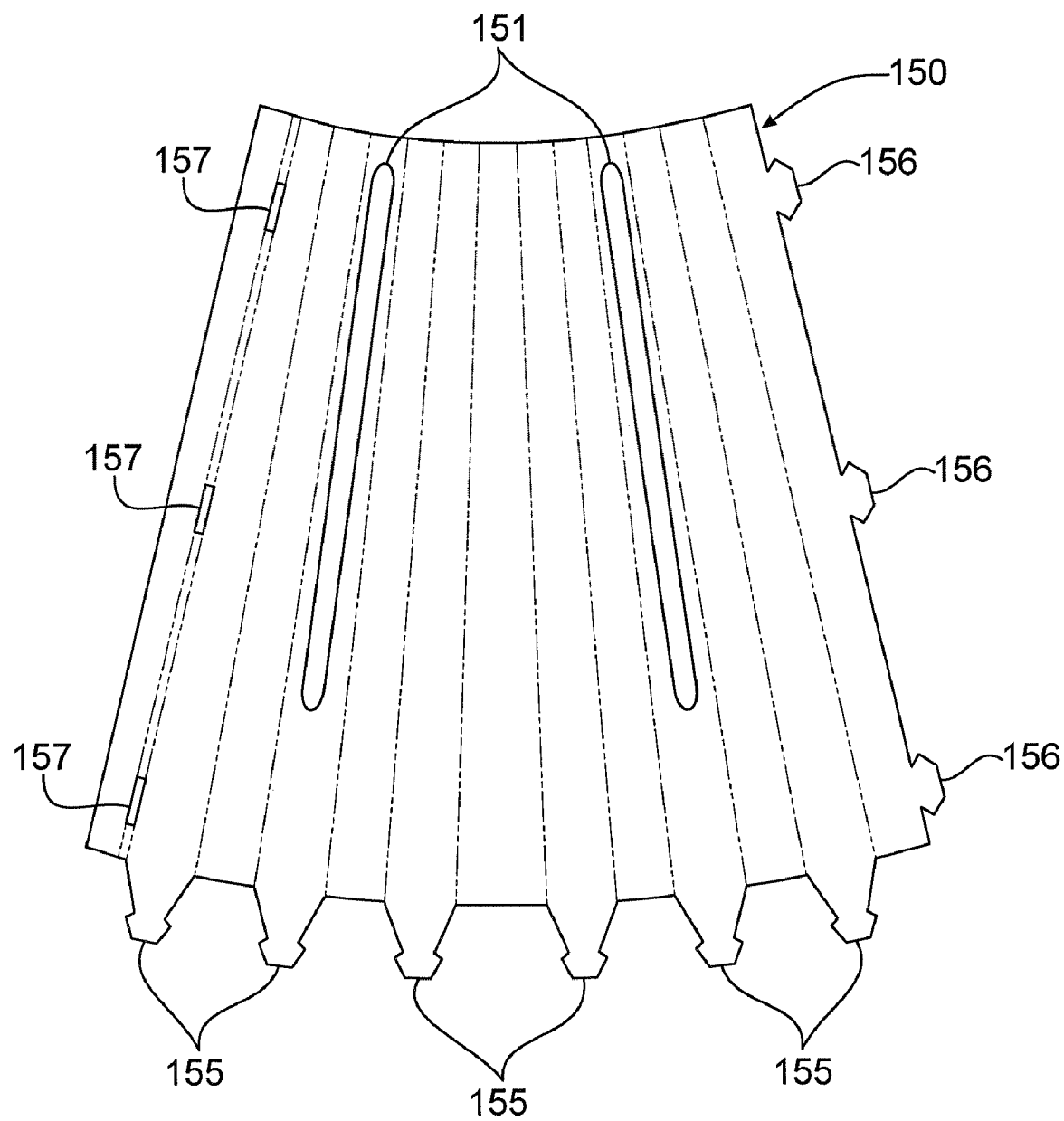
FIG. 5 is an illustration of an unfolded side view of an embodiment of the tapered core shown in FIG. 3.

FIG. 3 is an illustration of a side view of an embodiment of a tapered core 150 centrally connected to a base plate 140 as used in the welding wire assembly 100 of FIG. 1 and FIG. 2. FIG. 4 is an illustration of a top view of an embodiment of the base plate 140 shown in FIG. 3. FIG. 5 is an illustration of an unfolded side view of an embodiment of the tapered core 150 shown in FIG. 3. The unfolded tapered core 150 of FIG. 5 may be folded around to form the folded tapered core 150 of FIG. 1 and FIG. 2. In accordance with an embodiment of the present invention, upon folding around, tabs 156 may be inserted into tab receptors 157 to secure the tapered core 150 in a folded state. Other means of securing the tapered core 150 in a folded state are possible as well. For example, the one side edge of the tapered core 150 may be glued to the other side edge of the tapered core 150. The tapered core 150 may have a plurality of corrugated sides as shown in FIG. 1 and FIG. 5.

The base plate 140 may include a plurality of tab receptors 145. The tapered core 150 may include a plurality of tabs 155 adapted to insert (be received) into the plurality of tab receptors 145 in order to connect the tapered core 150 to the base plate 140. Again, the tapered core 150 may be substantially centered with respect to the base plate 140.

Other means may be provided to connect the tapered core 150 to the base plate 140. For example, the tapered core 150 may be glued to the base plate 140, or the tapered core 150 and the base plate 140 may be a single integrated piece, such as from a mold, for example. The tapered core 150 and base plate 140 may be made of cardboard, plastic, or any other material suitable for providing the functionality of the tapered core 150 and base plate 140. The tapered core 150 may be hollow or solid, in accordance with various embodiments.

Figure 6A:
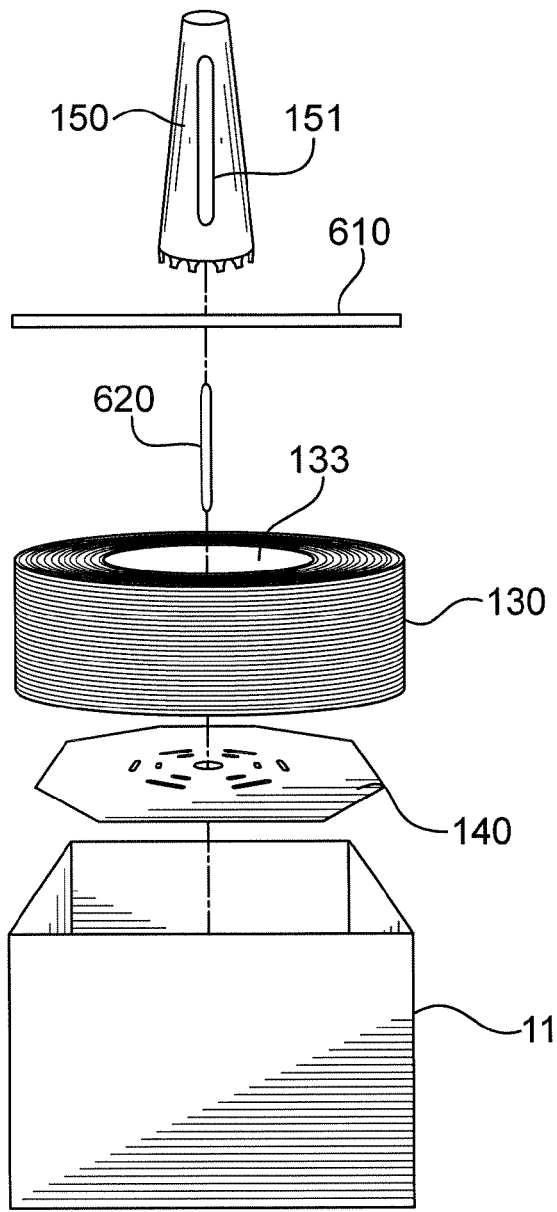
FIGS. 6A-6B are illustrations of an embodiment of a holding member and a tension member as used during shipment of at least a portion of the welding wire assembly of FIG. 1.
Figure 6B:
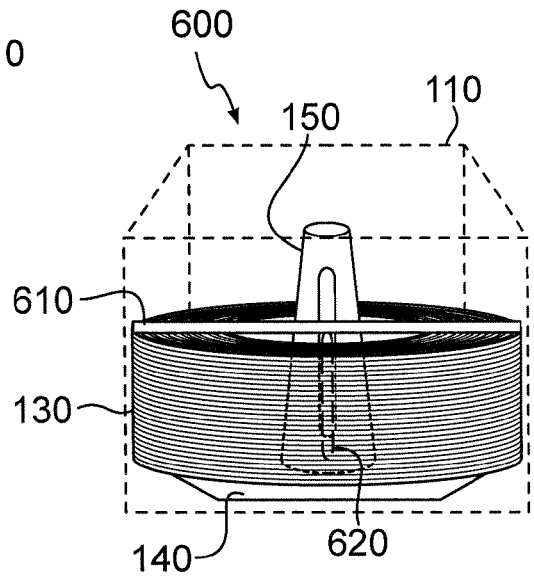

The tapered core 150 may include opposing slots 151 on each side of the tapered core 150 for accepting a holding member such as a steel rod. FIGS. 6A-6B illustrate an embodiment of a holding member 610 and a tension member 620 as used during shipment of at least a portion of the welding wire assembly 100 of FIG. 1. FIG. 6A is an exploded view of the shipping assembly 600 shown in FIG. 6B.

Again, the tapered core 150 is connected to the base plate 140 and placed into the payout drum package 110. The wire stack 130 is placed over the tapered core 150 and into the drum package 110, resting on the base plate 140. A holding member 610 (e.g., a steel rod) is inserted through the tapered core 150 via the slots 151 such that the holding member 610 rests on top of the wire stack 130. A tension member 620 (e.g., a rubber band) is connected between the holding member 610 and the base plate 140 or the bottom of the drum package 110 such that the tension member 620 pulls the holding member 610 against the wire stack 130. This helps hold the wire stack 130 in place during shipment, helping to avoid damage to the wire stack. Alternatively, two or more tension members 620 may be used (e.g., one on each side of the holding member 610). The drum package 110 includes a flat lid or flat top cover to enclose the drum package 110 during shipment. The flat lid may simply comprise four cardboard flaps attached to the sides of the drum package 110 which may be folded closed.

As an example of use of a tension member 620, a first end of a rubber band may loop around the holding member 610, and a second end of the rubber band may hook to a catch at the bottom of the drum package 110. An opening may be provided in the base plate 140 to provide access to the catch. In accordance with certain embodiments of the present invention, the tension member 620 may be connected between the holding member 610 and the base plate 140 (or bottom surface of the drum package 110) before the tapered core 150 is connected to the base plate 140, which may be more practical to accomplish in some embodiments.

In accordance with various embodiments, the holding member 610 may comprise a rod of metal (e.g., steel), plastic, or some other suitable material. The holding member 610 may instead comprise a flat plate and the slots 151 may be oriented horizontally instead of vertically, for example, to accommodate the flat plate. Furthermore, in accordance with various embodiments, the tension member may comprise a rubber band, an elastic strap, a bungee cord, a spring, or some other suitable tension member.

After shipment of the assembly 600, the drum package may be opened and the holding member 610 may be removed (e.g., by simply pulling the holding member 610 through the tapered core 150 via the slots 151) and the wire from the wire stack 130 may be released to spiral up around the tapered core 150. Again, the end of the wire may be fed through an opening 125 in a cover 120 to which a conduit 170 is attached. The cover 120 may then be secured to the top of the payout drum package 110, for example, via clips 115 or some other securing means.

Figure 7:
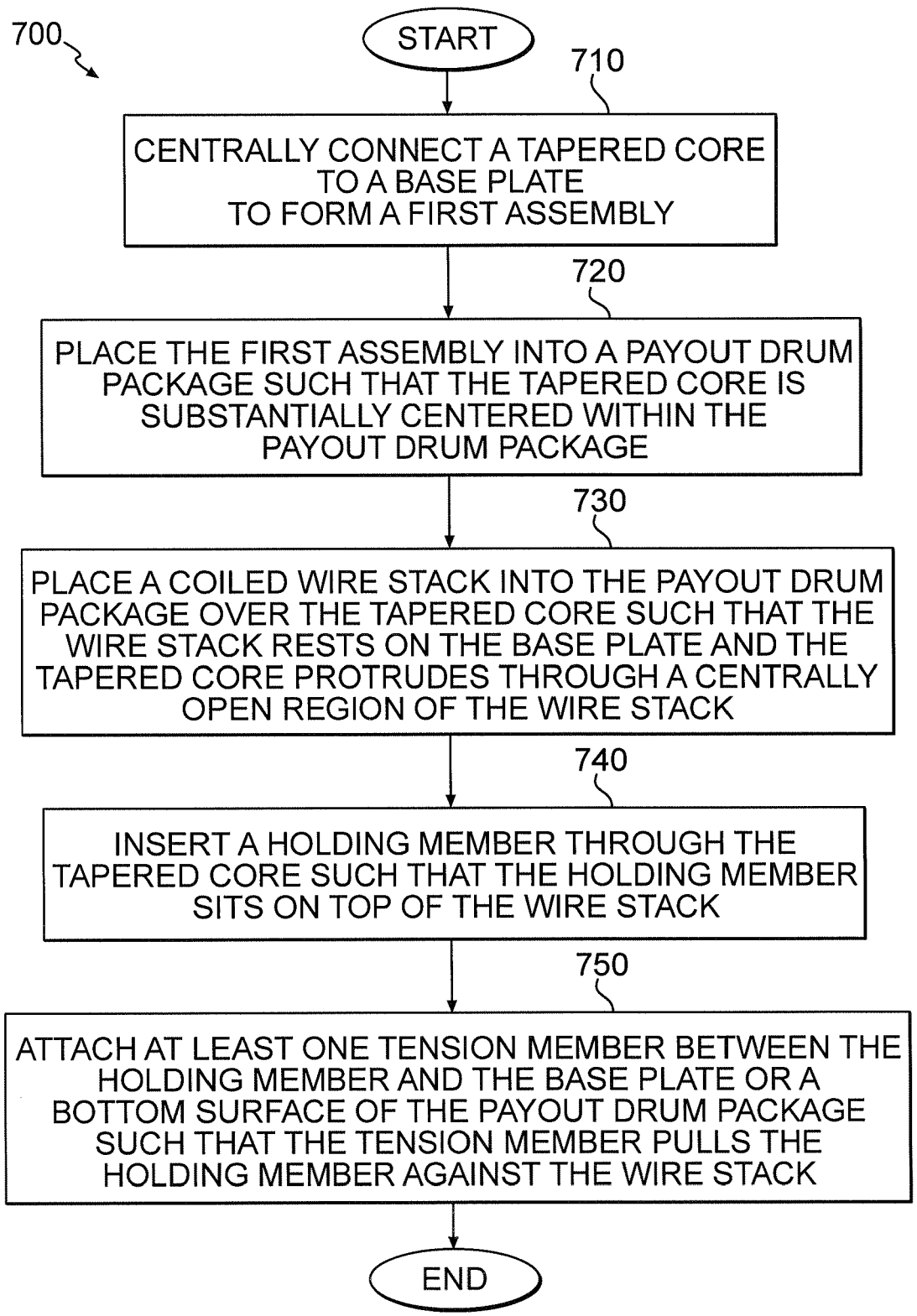
FIG. 7 is a flowchart of a first embodiment of a method of assembling a welding wire source for shipment.

FIG. 7 is a flowchart of a first embodiment of a method 700 of assembling a welding wire source 600 for shipment. In step 710, centrally connect a tapered core 150 to a base plate 140 to form a first assembly. In step 720, place the first assembly into a payout drum package 110 such that the tapered core 150 is substantially centered within the payout drum package 110. In step 730, place a coiled wire stack 130 into the payout drum package 110 over the tapered core 150 such that the wire stack 130 rests on the base plate 140 and the tapered core 150 protrudes through a centrally open region 133 of the wire stack 130. In step 740, insert a holding member 610 through the tapered core 150 such that the holding member 610 sits on top of the wire stack 130. In step 750, attach at least one tension member 620 between the holding member 610 and the base plate 140 or a bottom surface of the payout drum package 110 such that the tension member 620 pulls the holding member 610 against the wire stack 130.

These steps may be performed in this order or in another order as may be practical to do so. For example, the tension member 620 may be connected between the holding member 610 and the base plate 140 before the tapered core 150 is connected to the base plate 140. Furthermore, any given step may be divided into at least two sub-steps as may be practical to do so. For example, a first end of the tension member 620 may be first connected to the base plate 140, then a second end of the tension member 620 may be connected to (e.g., placed around) the holding member 610. Also, an additional step or steps may be performed in between any two successive steps. For example, the tension member 620 may be significantly stretched before connecting the tension member 620 between the holding member 610 and the base plate 140. Again, in accordance with various embodiments of the present invention, more than one tension member may be used. In certain embodiments, the tapered core 150 and the base plate 140 may be a single integral piece (first assembly), such as when molded. In such an embodiment, the step of centrally connecting the tapered core to the base plate need not be performed.

Figure 8:
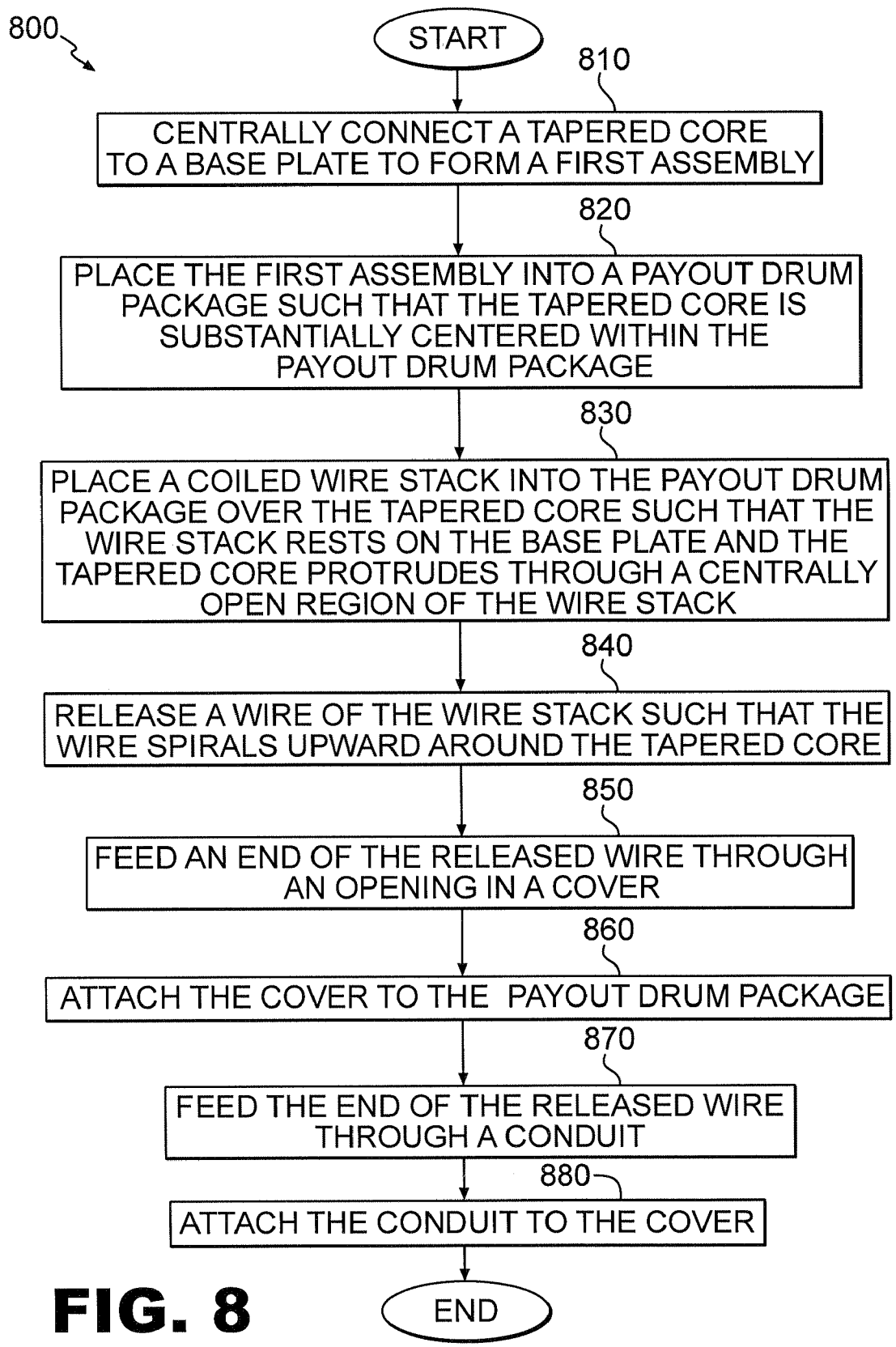
FIG. 8 is a flowchart of a first embodiment of a method of assembling a welding wire source for use in welding.

FIG. 8 is a flowchart of a first embodiment of a method 800 of assembling a welding wire source 100 for use in welding. In step 810, centrally connect a tapered core 150 to a base plate 140 to form a first assembly. In step 820, place the first assembly into a payout drum package 110 such that the tapered core 150 is substantially centered within the payout drum package 110. In step 830, place a coiled wire stack 130 into the payout drum package 110 over the tapered core 150 such that the wire stack 130 rests on the base plate 140 and the tapered core 150 protrudes through a centrally open region 133 of the wire stack 130. In step 840, release a wire of the wire stack 130 such that the wire spirals upward around the tapered core 150. In step 850, feed an end of the released wire through an opening 125 in a cover 120. In step 860, attach the cover 120 to the payout drum package 110. In step 870, feed the end of the released wire through a conduit 170. In step 880, attach the conduit 170 to the cover 120. The conduit 170 may attach to the cover 120 via a male/female type screw-on connection 175, for example.

Again, these steps may be performed in this order or in another order as may be practical to do so. For example, the base plate 140 may be placed into the drum package 110, and then the tapered core 150 may be connected to the base plate 140. Furthermore, any given step or steps may be divided into at least two sub-steps, or combined into one step, as may be practical to do so. For example, the end of the wire may be fed through both the cover 120 and the conduit 170 essentially at the same time in a single step if the conduit 170 is first connected to the cover 120. Also, an additional step or steps may be performed in between any two successive steps. For example, a holding member 610 may be removed from the tapered core 150 before releasing a wire of the wire stack 130. In certain embodiments, the tapered core 150 and the base plate 140 may be a single integral piece (first assembly), such as when molded. In such an embodiment, the step of centrally connecting the tapered core to the base plate need not be performed.

Figure 9:
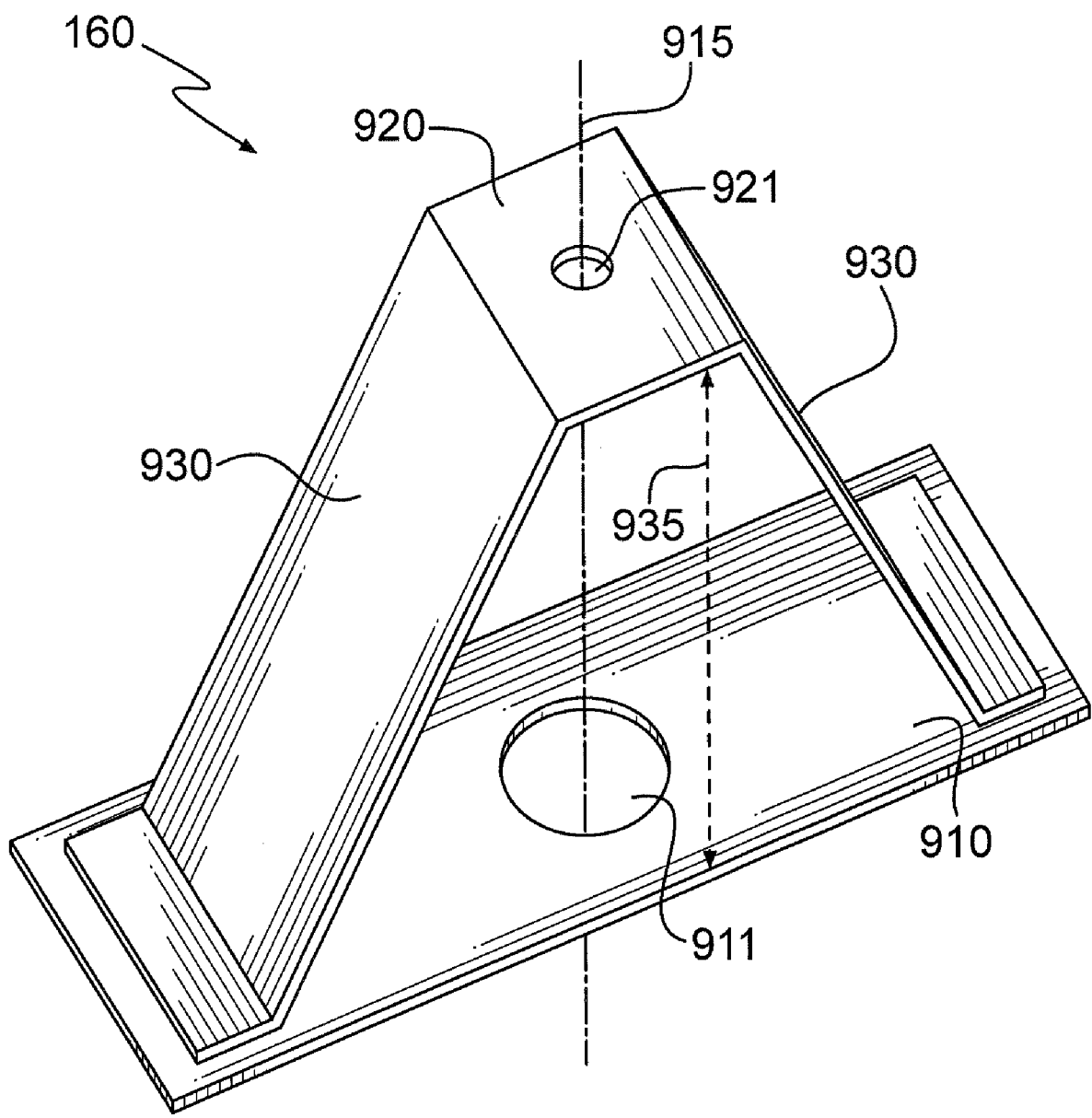
FIG. 9 is an illustration of a first embodiment of a wire guide insert as may be used in the welding wire assemby of FIG. 1 and FIG. 2.

FIG. 9 is an illustration of a first embodiment of a wire guide insert 160 as may be used in the welding wire assembly 100 of FIG. 1 and FIG. 2. The wire guide insert 160 (also generically referred to as a welding wire payoff arrangement herein) includes a base portion 910 having a first opening 911 located substantially in a central location of the base portion 910. The wire guide insert 160 also includes a top portion 920 being spatially offset from the base portion 910 and having a second opening 921 being smaller than the first opening 911, and being substantially aligned with the first opening 911 as shown by the dashed line 915. The wire guide insert 160 further includes an offset portion 930 connected between the top portion 920 and the base portion 910 for maintaining a spatial offset 935 between the top portion 920 and the base portion 910.

In accordance with an embodiment of the present invention, the base portion 910 is substantially longer than the top portion 920 and the base portion 910 is substantially parallel to the top portion 920. The offset portion 930 is angled with respect to the parallel top and base portions such that the top portion 920, the base portion 910, and the offset portion 930 characterize a substantially truncated triangular volume.

In accordance with an embodiment of the present invention, the offset portion 930 and the top portion 920 may be all one integral piece which is then connected to the base portion 910 (e.g., by snapping or glueing). As an alternative, the base portion 910, the offset portion 930, and the top portion 920 may all be one integral piece. Other piecewise or integral constructions are possible as well that characterize a substantially truncated triangular volume.

Referring to FIG. 1 and FIG. 2, the top portion 920 may be connected inside the cover 120 such that the opening 921 is adjacent to and substantially aligned with the opening 125 in the cover 120. The wire from the wire stack 130 may be fed upward from around the tapered core 150, through the opening 911, through the opening 921, and through the opening 125 and into the conduit 170.

When connected to the cover 120, the angled offset portions 930 of the wire guide insert 160 substantially follow a contour of an interior surface of the cover 120. This allows the wire guide insert 160 to just fit up into the interior of the cover 120. The base portion 910 of the wire insert guide 160 helps to hold the spirals of wire off of the wire stack 130 down around the tapered core 150, helping to provide the desired tension on the wire for smooth pay off. The wire guide insert 160 effectively bridges the gap across the inside of the cover 120 to prevent the wire loops (spirals) from springing up. The wire guide insert 160 may be made of thermoformed plastic or cardboard, or any other suitable material.

Figure 10:
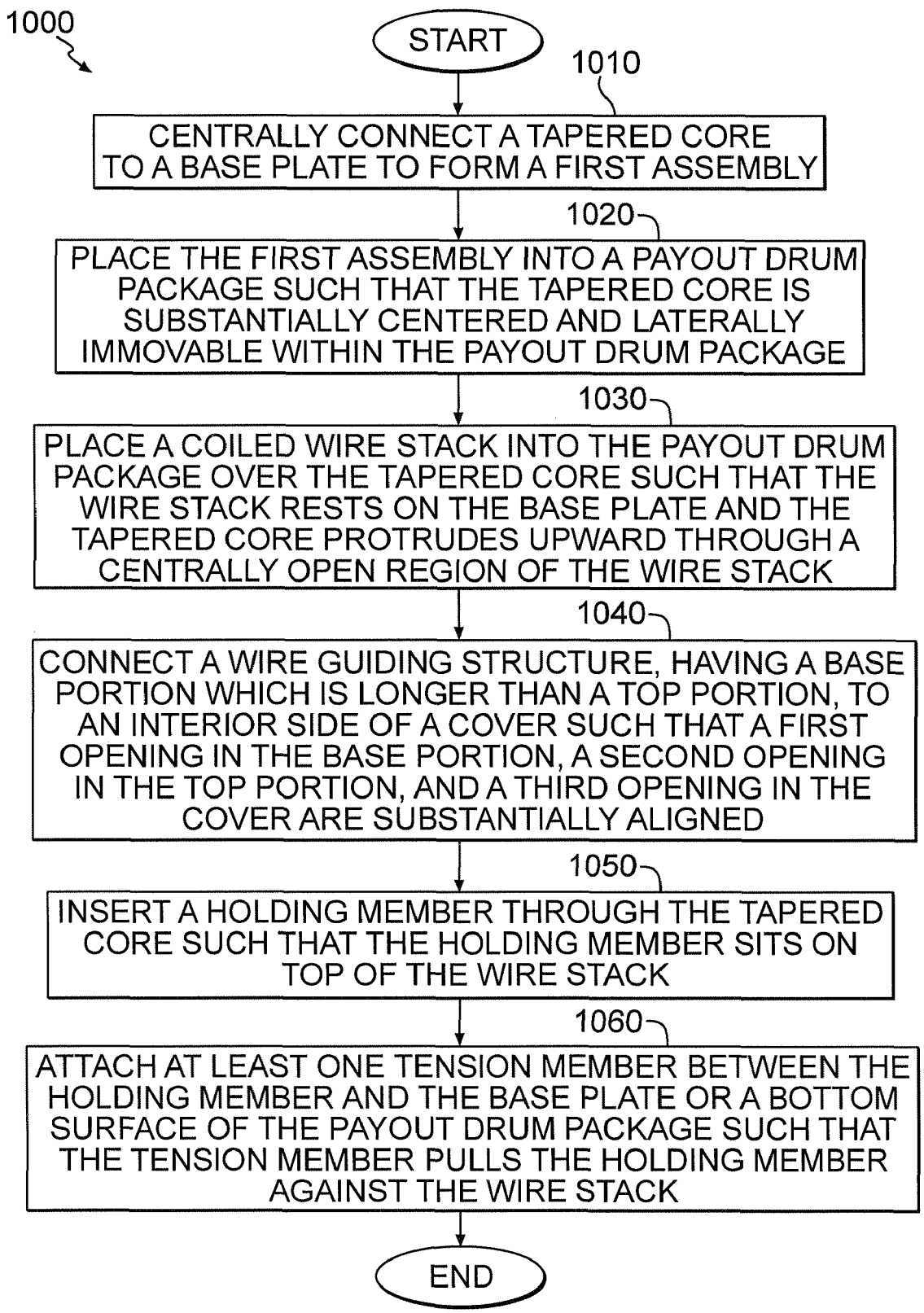
FIG. 10 is a flowchart of a second embodiment of a method of assembling a welding wire source for shipment.

FIG. 10 is a flowchart of a second embodiment of a method 1000 of assembling a welding wire source for shipment. In step 1010, centrally connect a tapered core 150 to a base plate 140 to form a first assembly. In step 1020, place the first assembly into a payout drum package 110 such that the tapered core 150 is substantially centered and laterally immovable within the payout drum package 110. In step 1030, place a coiled wire stack 130 into the payout drum package 110 over the tapered core 150 such that the wire stack 130 rests on the base plate 140 and the tapered core 150 protrudes upward through a centrally open region 133 of the wire stack 130.

In step 1040, connect a wire guiding structure 160, having a base portion 910 which is longer than a top portion 920, to an interior portion of a cover 120 such that a first opening 911 in the base portion 910, a second opening 921 in the top portion 920, and a third opening 125 in the cover are substantially aligned. In step 1050, insert a holding member 610 through the tapered core 150 such that the holding member 610 sits on top of the wire stack 130. In step 1060, attach at least one tension member 620 between the holding member 610 and the base plate 140 or a bottom surface of the payout drum package 110 such that the tension member 620 pulls the holding member 610 against the wire stack 130.

Again, these steps may be performed in this order or in another order as may be practical to do so. For example, the tension member 620 may be connected between the holding member 610 and the base plate 140 before the tapered core 150 is connected to the base plate 140. Furthermore, any given step may be divided into at least two sub-steps as may be practical to do so. For example, a first end of the tension member 620 may be first connected to the base plate 140, then a second end of the tension member 620 may be connected to (e.g., placed around) the holding member 610. Also, an additional step or steps may be performed in between any two successive steps. For example, the tension member 620 may be significantly stretched before connecting the tension member 620 between the holding member 610 and the base plate 140. Again, in accordance with various embodiments of the present invention, more than one tension member may be used. In certain embodiments, the tapered core 150 and the base plate 140 may be a single integral piece (first assembly), such as when molded. In such an embodiment, the step of centrally connecting the tapered core to the base plate need not be performed.

Figure 11:
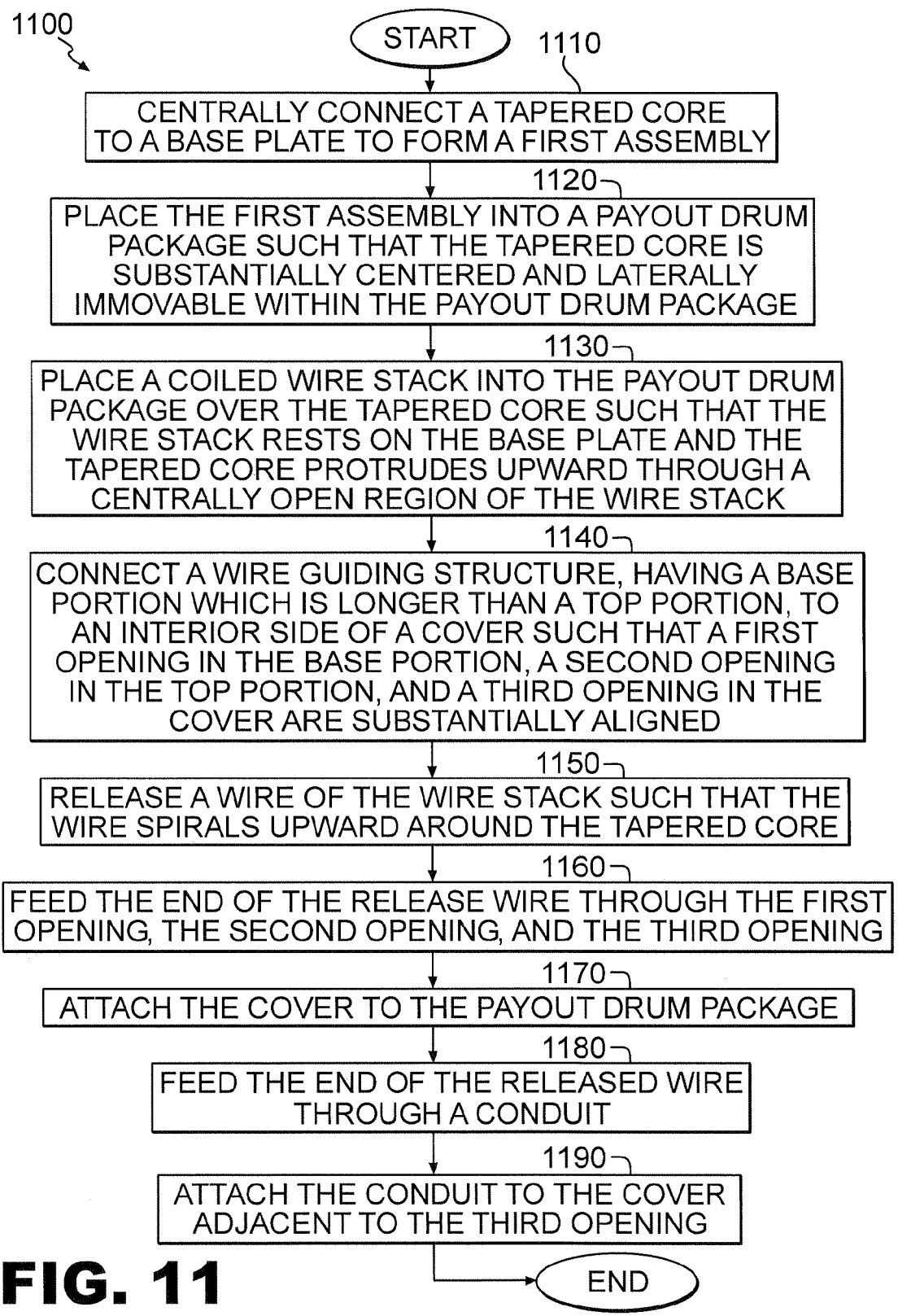
FIG. 11 is a flowchart of a second embodiment of a method of assembling a welding wire source for use in welding.

FIG. 11 is a flowchart of a second embodiment of a method 1100 of assembling a welding wire source 100 for use in welding. In step 1110, centrally connect a tapered core 150 to a base plate 140 to form a first assembly. In step 1120, place the first assembly into a payout drum package 110 such that the tapered core 150 is substantially centered and laterally immovable within the payout drum package 110. In step 1130, place a coiled wire stack 130 into the payout drum package 110 over the tapered core 150 such that the wire stack 130 rests on the base plate 140 and the tapered core 150 protrudes upward through a centrally open region 133 of the wire stack 130.

In step 1140, connect a wire guiding structure 160, having a base portion 910 which is longer than a top portion 920, to an interior side of a cover 120 such that a first opening 911 in the base portion 910, a second opening 921 in the top portion 920, and a third opening 125 in the cover 120 are substantially aligned. In step 1150, release a wire of the wire stack 130 such that the wire spirals upward around the tapered core 150. In step 1160, feed an end of the released wire through the first opening 911, the second opening, 921, and the third opening 125. In step 1170, attach the cover 120 to the payout drum package 110. In step 1180, feed the end of the release wire through a conduit 170. In step 1190, attach the conduit 170 to the cover 120 adjacent to the third opening 125. The conduit 170 may attach to the cover 120 via a male/female type screw-on connection 175, for example.

Again, these steps may be performed in this order or in another order as may be practical to do so. For example, the base plate 140 may be placed into the drum package 110, and then the tapered core 150 may be connected to the base plate 140. Furthermore, any given step or steps may be divided into at least two sub-steps, or combined into one step, as may be practical to do so. For example, the end of the wire may be fed through both the cover 120 and the conduit 170 essentially at the same time in a single step if the conduit 170 is first connected to the cover 120. Also, an additional step or steps may be performed in between any two successive steps. For example, a holding member 610 may be removed from the tapered core 150 before releasing a wire of the wire stack 130. In certain embodiments, the tapered core 150 and the base plate 140 may be a single integral piece (first assembly), such as when molded. In such an embodiment, the step of centrally connecting the tapered core to the base plate need not be performed.

Figure 12A:
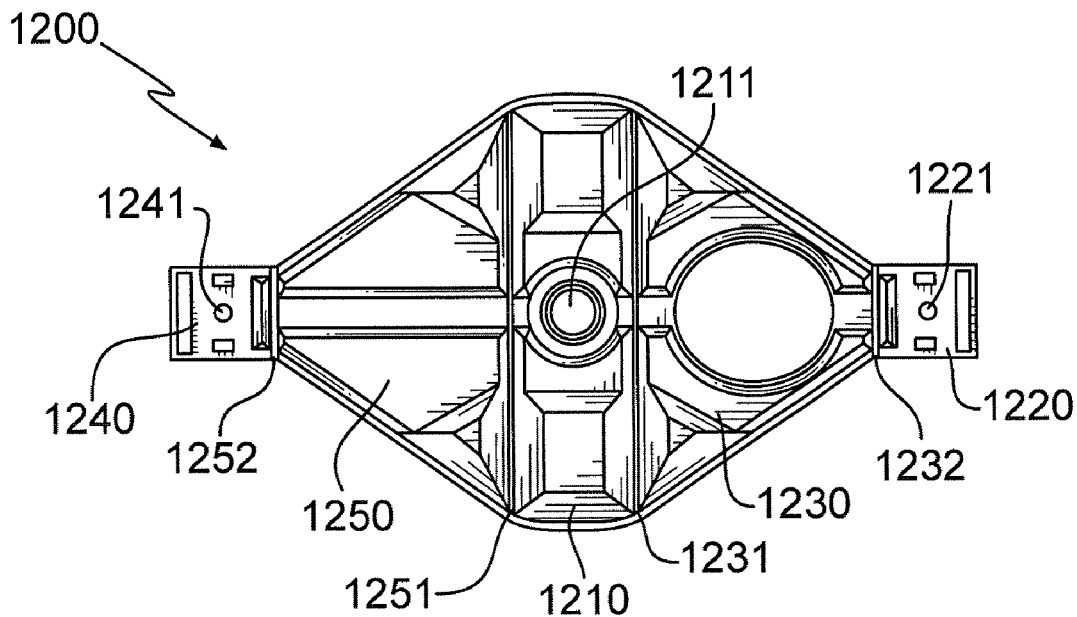
FIGS. 12A-12B illustrate two unfolded views of a second embodiment of a wire guide insert capable of being used in the welding wire assembly of FIG. 1 and FIG. 2.
Figure 12B:
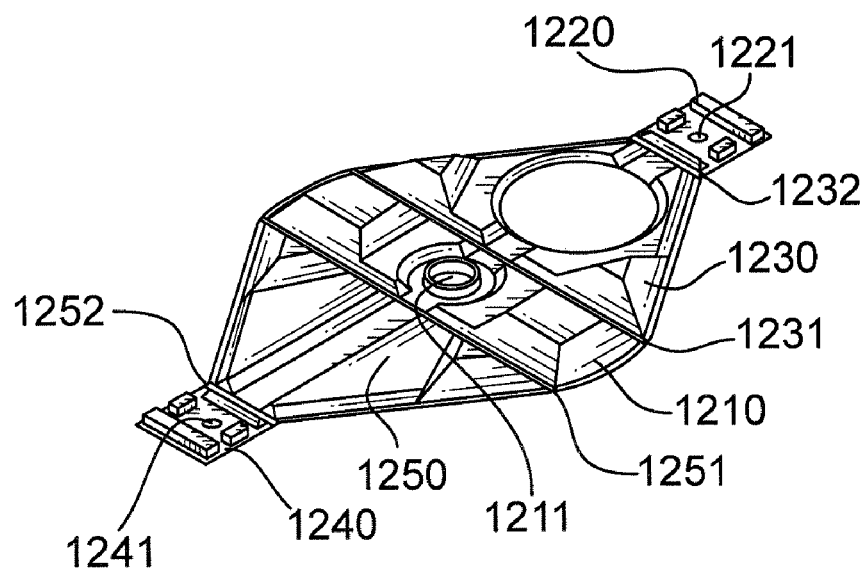

FIGS. 12A-12B are illustrations of two unfolded views of a second embodiment of a wire guide insert 1200 capable of being used in the welding wire assembly 100 of FIG. 1 and FIG. 2. The wire guide insert 1200 performs the same function in the welding wire source 100 as the wire guide insert 160 previously described herein. FIG. 12A is a top view and FIG. 12B is a perspective view.

The wire guide insert 1200 (also generically referred to as a welding wire payoff arrangement or welding wire structure herein) includes a base means 1210 for holding down spirals of coiled wire payed off from a wire stack 130 within a payout drum package 110. The base means 1210 has a first opening 1211 for guiding the wire through the base means 1210 as the wire is payed off from the wire stack 130. The wire guide insert 1200 also includes a first top means 1220 offset from the base means 1210 for receiving the wire from the base means 1210 as the wire is payed off. The first top means 1220 has a second opening 1221 for guiding the wire through the first top means 1220 toward a cover 120 of the payout drum package 110 as the wire is payed off. The cover 120 has a fourth opening means 125 as previously described herein.

The wire guide insert 1200 also includes a first offset means 1230 hingedly connecting the base means 1210 to the first top means 1220 at hinged points 1231 and 1232. The wire guide insert 1200 further includes a second top means 1240 spatially offset from the base means 1210 for receiving the wire from the first top means 1220 as the wire is payed off. The second top means 1240 has a third opening means 1241 for guiding the wire through the second top means 1240 toward the cover 120 as the wire is payed off. The wire guide insert 1200 also includes a second offset means 1250 hingedly connecting the base means 1210 to the second top means 1240 at hinged points 1251 and 1252.

The base means 1210 is substantially longer than either of the top means 1220 or 1240. The length and other dimensions of the first top means 1220 and the second top means 1240 are substantially the same. The base means 1210, the first offset means 1230, the second offset means 1250, the first top means 1220, and the second top means 1240 are capable of being hingedly unfolded with respect to each other to characterize a substantially outstretched surface as shown in FIGS. 12A-12B. Such an outstretched configuration may result when manufacturing the wire guide insert 1200, and the wire guide insert 1200 may be shipped (not yet connected to a cover 120) in such an outstretched manner.

Figure 13A:
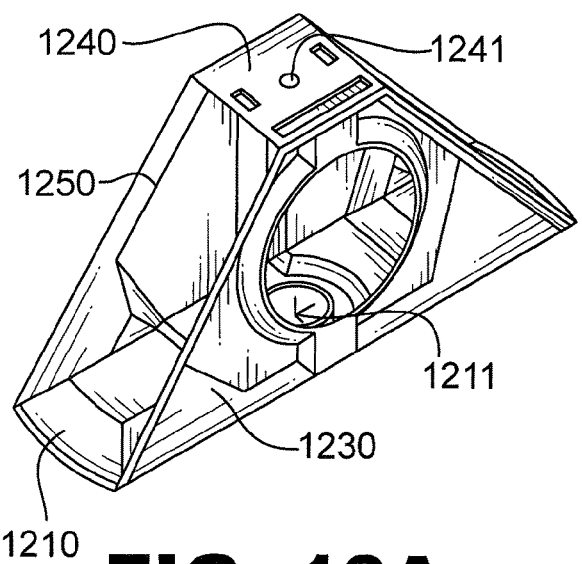
FIGS. 13A-13C are illustrations of several folded views of the second embodiment of the wire guide insert of FIGS. 12A-12B.
Figure 13B:
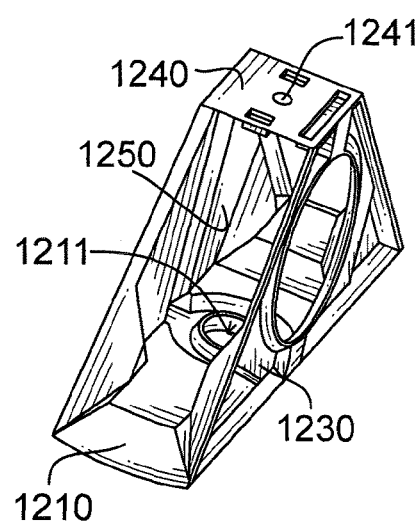
Figure 13C:
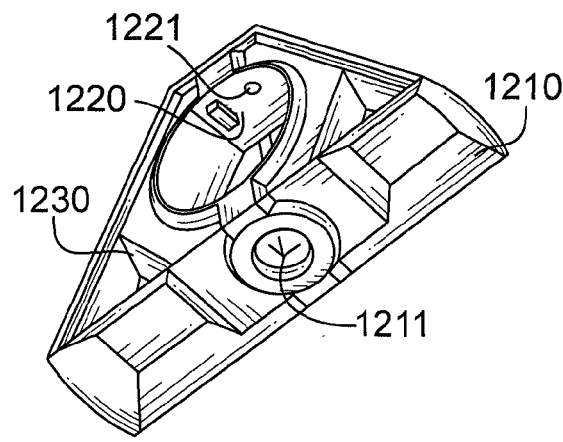
Figure 14:
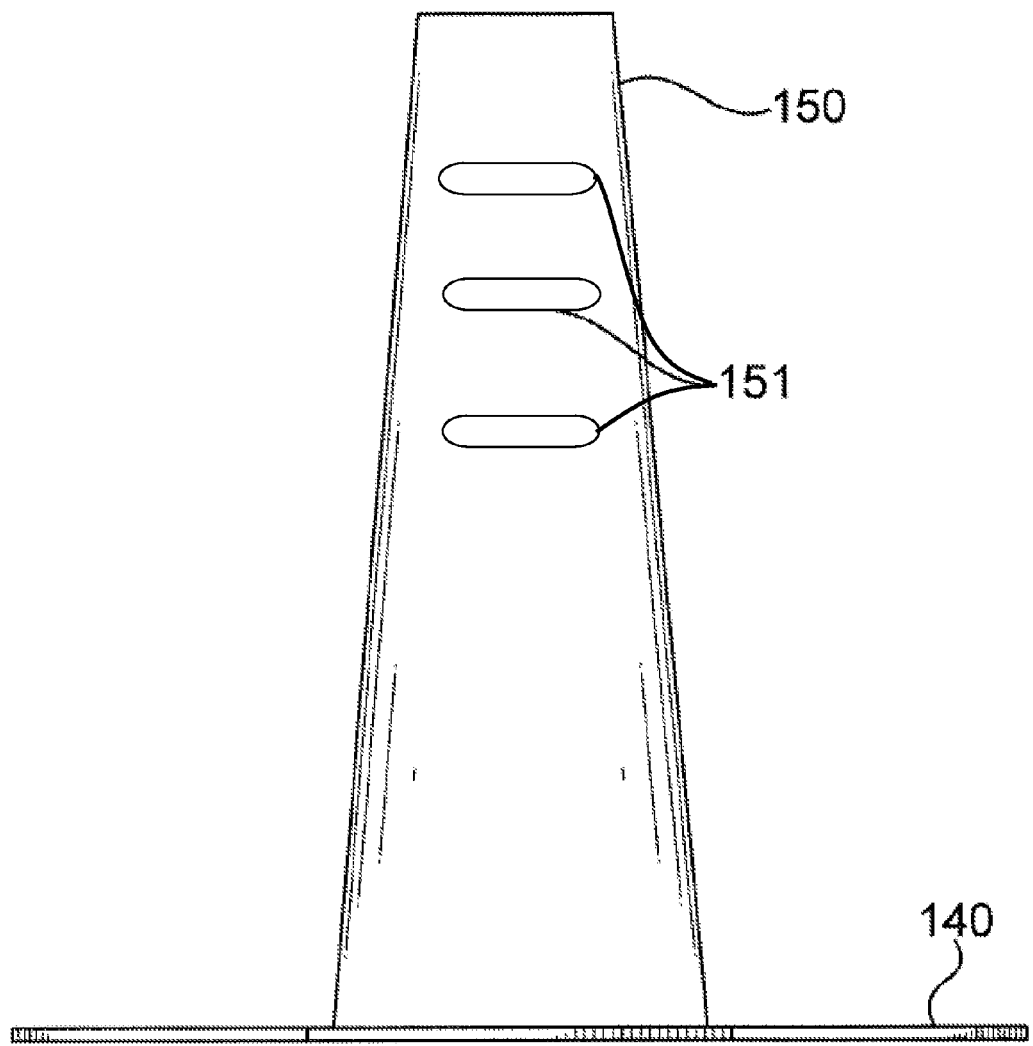
FIG. 14 is an illustration of a side view of an embodiment of a tapered core centrally connected to a base plate as used in the welding wire assembly of FIG. 1 and FIG. 2.

FIGS. 13A-13C are illustrations of several folded views of the second embodiment of the wire guide insert 1200 of FIGS. 12A-12B, as would be used in the welding wire arrangement 100 of FIGS. 1-2. The base means 1210, the first offset means 1230, the second offset means 1250, the first top means 1220, and the second top means 1240 are capable of being hingedly folded with respect to each other to characterize a substantially truncated triangular volume as shown in FIGS. 13A-13C.

The hinged points 1231, 1232, 1251 and 1252 may comprise, for example, flexible plastic that is easily folded or may comprise actual hinges that are connected between the base means and offset means and the offset means and the top means. In accordance with an embodiment of the present invention, the wire guide insert 1200 is all one molded piece made of a plastic material. Other materials are possible as well such as, for example, cardboard.

The opening means 1211 is substantially larger than either of the opening means 1221 and 1241, in accordance with an embodiment of the present invetion. When folded, the first top means 1220, the second top means 1240, and the cover 120 are capable of being configured such that the first opening means 1211, the second opening means 1221, the third opening means 1241, and the fourth opening means 125 are substantially aligned. The wire guiding structure 1200 connects to the cover 120 in much the same manner as the wire guiding insert 160 (see FIGS. 1-2) and serves the same purpose.

When folded, the second top means 1240 overlaps onto the first top means 1220 and may snap onto the first top means 1220 to hold the structure 1200 together in the folded configuration. As an alternative, the two top means 1220 and 1240 may be held together only when installed in the interior of the cover 120 by, for example, a connector 175 having, for example, a bolt and nut assembly.

In accordance with an alternative embodiment, the wire guide insert 1200 may be manufactured as a single molded piece, already in the folded configuration and not having any hinged connections. Similarly, the wire guide insert 1200 may be manufactured as a plurality of pieces (e.g., a base means 1210, a first offset means 1230, a second offset means 1250, and a top means 1220) that are connected (e.g., snapped) together to characterize the substantially truncated triangular volume. Other piecewise or integral constructions are possible as well.

In summary, arrangements and methods are disclosed for welding wire payoff sources. A tapered core and base plate, optionally along with a wire guide insert, may be configured with a payout drum package and a cover containing a welding wire stack such that the welding wire is payed off smoothly from the wire stack during an arc welding operation, without the welding wire flipping or tangling.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A welding wire payoff arrangement, said arrangement comprising:
    a base plate;
    a vertically oriented folded tapered core centrally connected to said base plate, wherein said folded tapered core includes two opposing and substantially circumferentially-oriented slots located above a top of a wire stack surrounding the core, and wherein said folded tapered core is initially flat in its unfolded state; and
    a wire guide insert positioned above said tapered core, said wire guide insert including a base portion, a first opening through said base portion, a top portion being spatially offset from said base portion, a second opening through said top portion, and an offset portion connected between said top portion and said base portion for maintaining a spatial offset between said base portion and said top portion.

2. The welding wire payoff arrangement of claim 1 wherein said base plate includes a plurality of tab receptors.

3. The welding wire payoff arrangement of claim 2 wherein said tapered core includes a plurality of tabs adapted to be received into said plurality of tab receptors to centrally connect said tapered core to said base plate.

4. The welding wire payoff arrangement of claim 1 wherein said base plate is substantially octagonal in shape.

5. The welding wire payoff arrangement of claim 1 further comprising a rod capable of being received through said two opposing slots of said folded tapered core.

6. The welding wire payoff arrangement of claim 1 further comprising a payout drum package in which said tapered core and said base plate reside.

7. The welding wire payoff arrangement of claim 6 further comprising a wire stack residing within said payout drum package such that said wire stack rests on said base plate and said tapered core protrudes through a centrally open region of said wire stack.

8. The welding wire payoff arrangement of claim 1 wherein a first diameter or a first width of an unconnected end of said tapered core is less than a second diameter or a second width of a connected base end of said tapered core.

9. A method of assembling a welding wire source, said method comprising:
    centrally connecting a vertically oriented folded tapered core to a base plate to form a first assembly, wherein said folded tapered core includes two opposing and substantially circumferentially-oriented slots located above a top of a coiled wire stack surrounding the core, and wherein said folded tapered core is initially flat in its unfolded state;
    placing the first assembly into a payout drum package such that said tapered core is substantially centered within said payout drum package;
    placing the coiled wire stack into said payout drum package over said tapered core such that said wire stack rests on said base plate and said tapered core protrudes through a centrally open region of said wire stack;

releasing a wire of said wire stack such that said wire spirals upward around said tapered core; and feeding an end of said released wire through a wire guide insert having a base portion, a first opening through said base portion, a top portion being spatially offset from said base portion, a second opening through said top portion, and an offset portion connected between said top portion and said base portion for maintaining a spatial offset between said base portion and said top portion.

10. The method of claim 9 further comprising:

feeding said end of said released wire through an opening in a cover,
wherein said cover is a transparent plastic material;

attaching said wire guide insert to said cover;

attaching said cover to said payout drum package,
wherein said attaching said cover to said payout drum package is via clips;

feeding said end of said released wire through a conduit; and attaching said conduit to said cover.

11. The method of claim 9 further comprising:

inserting a holding member through said opposing slots of said folded tapered core such that said holding member sits on top of said wire stack; and attaching at least one tension member between said holding member and said base plate or a bottom surface of said payout drum package such that said tension member pulls said holding member against said wire stack.

12. The method of claim 11 wherein said holding member comprises a steel rod.

13. The method of claim 11 wherein said tension member is selected from the group consisting of a bungee cord and a spring.

14. A welding wire payoff arrangement, said arrangement comprising:

vertically oriented folded tapered core means for spirally guiding a wire payed off from a wire stack, wherein said folded tapered core means includes two opposing and substantially circumferentially-oriented slots means located above a top of the wire stack surrounding the core means, and wherein said folded tapered core means is initially flat in its unfolded state;

base means for centrally supporting said tapered core means within a payout drum package; and wire guide insert means having a base portion for holding down spirals of a coiled wire and for receiving an end of said coiled wire through said base portion.

15. The welding wire payoff arrangement of claim 14 wherein said base means includes at least one first connector means for connecting said tapered core means to said base means.

16. The welding wire payoff arrangement of claim 15 wherein said tapered core means includes at least one second connector means for connecting said tapered core means to said base means via said first connector means.

17. The welding wire payoff arrangement of claim 14 wherein said base means is substantially octagonal in shape.

18. The welding wire payoff arrangement of claim 14 further comprising a rod means for securing said wire stack within said payout drum package.

19. The welding wire payoff arrangement of claim 18 wherein said rod means is capable of being received through said two opposing slots of said folded tapered core means.

20. The welding wire payoff arrangement of claim 14 wherein a first diameter or a first width of a first end of said tapered core means is less than a second diameter or a second width of a second end of said tapered core means.

* * * * *